J. H. SHAW.
LOCK.
APPLICATION FILED FEB. 12, 1914.

1,229,334.

Patented June 12, 1917.
4 SHEETS—SHEET 1.

WITNESSES:
F. A. Carlson
M. O. Williams

INVENTOR
John H. Shaw
BY
ATTORNEY

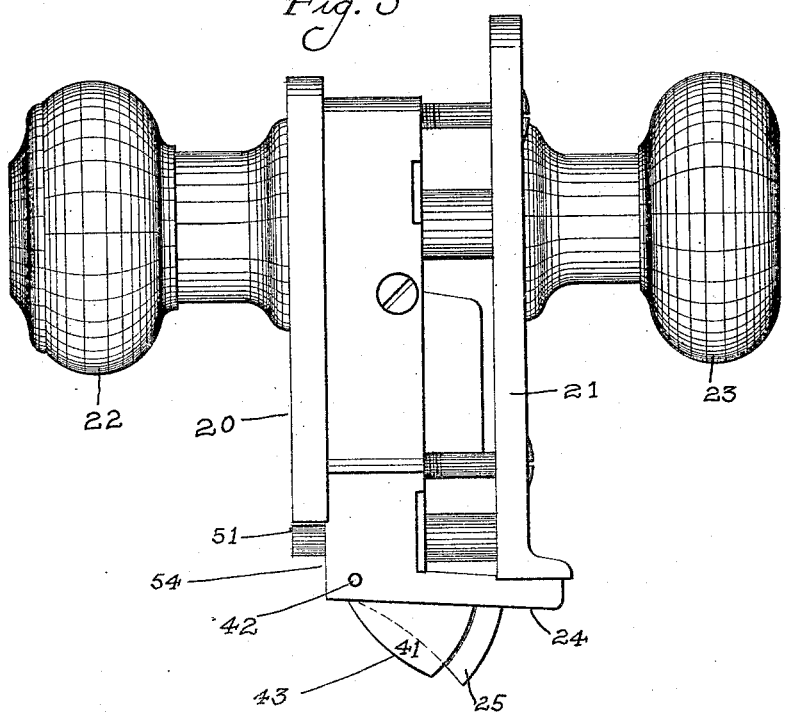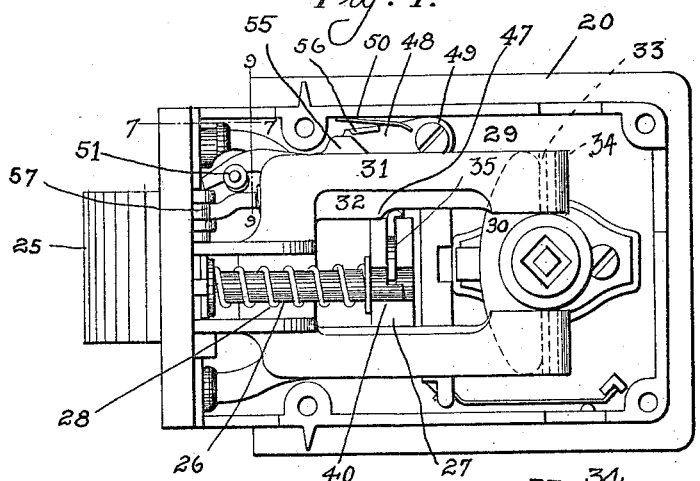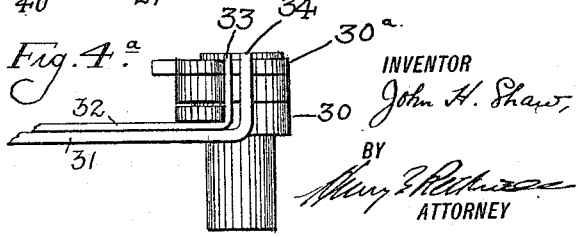

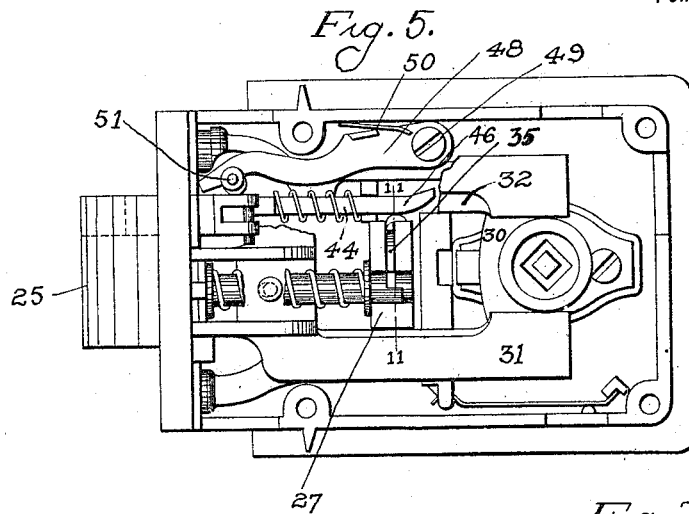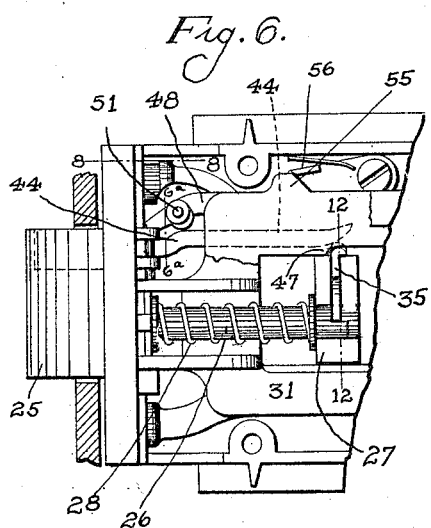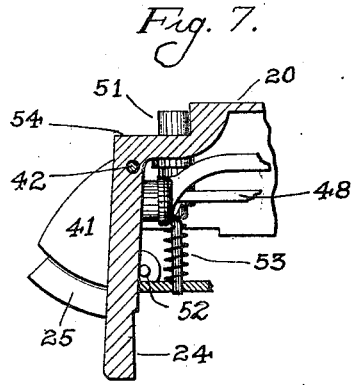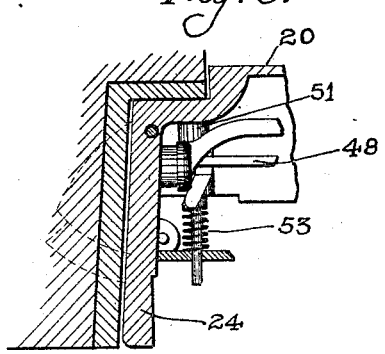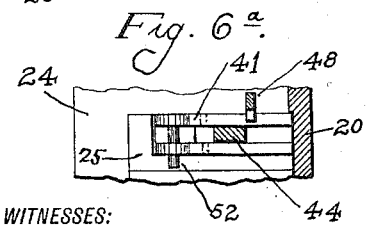

J. H. SHAW.
LOCK.
APPLICATION FILED FEB. 12, 1914.
1,229,334.
Patented June 12, 1917.
4 SHEETS—SHEET 4.
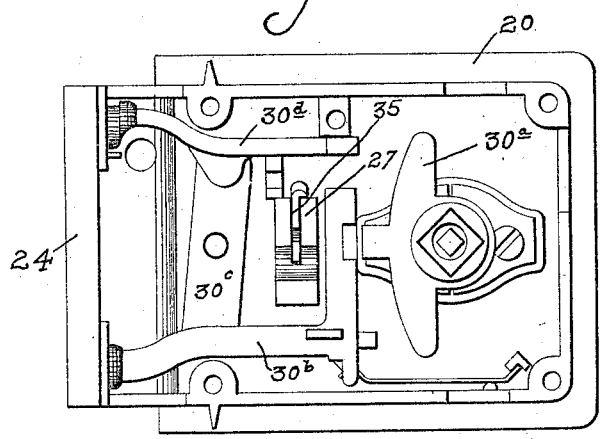
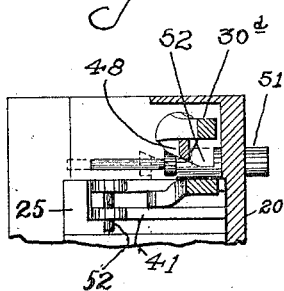
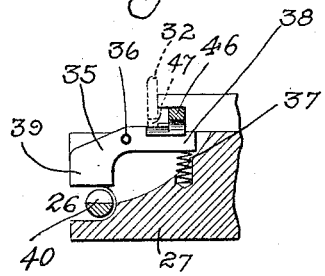
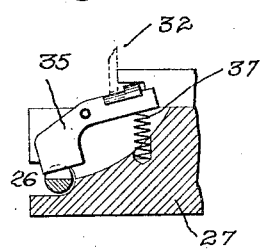
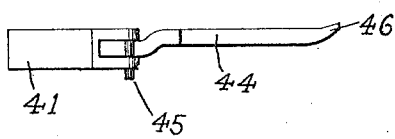
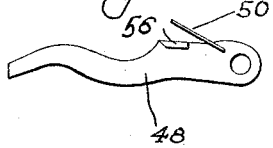
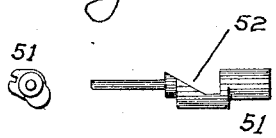
WITNESSES:
INVENTOR
John H. Shaw
BY
ATTORNEY

UNITED STATES PATENT OFFICE.

JOHN H. SHAW, OF NEW HAVEN, CONNECTICUT, ASSIGNOR TO SARGENT & COMPANY, OF NEW HAVEN, CONNECTICUT, A CORPORATION OF CONNECTICUT.

LOCK.

1,229,334.  Specification of Letters Patent.  Patented June 12, 1917.

Application filed February 12, 1914.  Serial No. 818,398.

*To all whom it may concern:*

Be it known that I, JOHN H. SHAW, a citizen of the United States, residing in the city and county of New Haven and State of Connecticut, have invented certain new and useful Improvements in Locks, of which the following is a full, clear, and exact description.

The present invention relates to locks, and more particularly to locks having a guarded latch bolt. In the embodiment shown in the drawings, my improvements are applied to a union or escutcheon lock, but it will be understood from the following description that they are likewise applicable to locks of other types.

In locks where the latch bolt is guarded by a deadlocking device which is normally held inoperative, and only released from an inoperative position by contact with the strike of a controller projecting through the lock front or face plate, it has been demonstrated by experience that the guarding or deadlocking mechanism frequently gets out of order, and fails to work properly. Very often, this is due to the shrinking of the door away from the strike to such an extent that the controller of the deadlocking mechanism is not pushed in far enough when the door is closed. Again, the deadlocking member is apt to jam or stick in the inoperative position which it normally occupies.

The primary object of my invention is to overcome the disadvantages above stated. More particularly, the present invention contemplates the provision of a lock, wherein the latch bolt instead of being guarded by a deadlocking member, which moves to deadlocking position only when the door is closed, is guarded by a deadlocking member which is normally operative to deadlock the latch bolt when the door is either open or closed. Provision is made for releasing the latch bolt momentarily as the door is closed to permit its incursion on contact with the strike as usual, but as the latch moves out into the opening in the strike, the deadlocking member immediately reassumes its normal deadlocking position. My invention also contemplates the provision of a lock of this description, in which it is impossible to force back the latch bolt by tampering with the above mentioned releasing means when the door is closed.

To these and other ends, the invention consists in the novel features and combinations of parts to be hereinafter described and claimed.

In the accompanying drawings,

Fig. 3 is a top plan view of the lock.

Fig. 4 is an inside view of one escutcheon and the lock mechanism carried thereby, with the cover plate omitted, showing the parts in the positions which they assume when the latch bolt and the releasing bolt are protracted.

Figure 1:
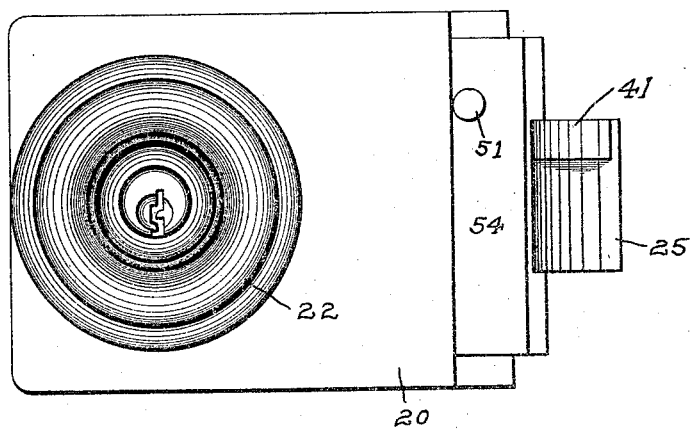
Figure 1 is a side elevation of a unit lock embodying my improvements.
Figure 2:
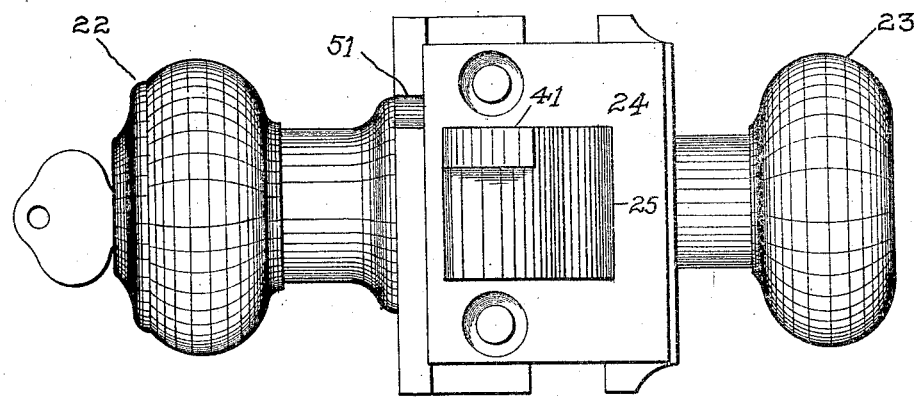
Fig. 2 is an end elevation of the lock, looking toward the face plate or front.

Fig. 4$^a$ is a detail of the hubs and latch bolt retracting yoke.

Fig. 5 is a view similar to Fig. 4, showing the releasing bolt partly retracted, so as to release the latch bolt.

Fig. 6 is a fragmentary view similar to Fig. 4, showing the position of the parts when the door is closed.

Fig. 6$^a$ is a section on line 6$^a$—6$^a$ of Fig. 6.

Fig. 7 is a section on line 7—7 of Fig. 4.

Fig. 8 is a section on line 8—8 of Fig. 6.

Fig. 9 is a section on line 9—9 of Fig. 4.

Fig. 10 is a view similar to Fig. 4, with the latch bolt, releasing bolt and other parts omitted.

Fig. 11 is a section on line 11—11 of Fig. 5.

Fig. 12 is a section of line 12—12 of Fig. 6.

Fig. 13 is a detail of the releasing bolt.

Fig. 14 is a detail of the deadlocking member for the releasing bolt, and.

Fig. 15 shows in end elevation and side elevation the controller for said deadlocking member.

Referring to the drawings, the lock selected for illustration comprises an outer escutcheon 20, an inner escutcheon 21, an outer knob 22, an inner knob 23, a face plate 24, and a latch bolt 25 projecting through the face plate, and adapted to be retracted by mechanism carried by the outer escutcheon. The latch bolt selected for illustration is of the pivoted, or car latch, type and it is provided with a spindle or stem 26, guided at its rear end in a post or standard 27 projecting inward from the outer escutcheon. Between the standard and the latch bolt a spring 28 surrounds the latch bolt spindle 26, which spring normally holds the latch bolt in its protracted position. The latch bolt is adapted to be retracted by means of a two-part yoke 29, coöperating with a hub 30, operated by the inside knob 23, and a hub 30ª operated by the outside knob 22. The outer knob may be dogged by stop work mechanism 30ᵇ, 30ᶜ, 30ᵈ associated with the outside hub, as shown in Fig. 10. The parts or members of the yoke 29 are indicated at 31 and 32 respectively, the part 31 being suitably secured to the latch bolt, and the part 32 having a lost motion (pin and slot) connection with the part 31, as indicated in Fig. 5, and being provided with lugs or wings 33, coöperating directly with the hubs 30 and 30ª respectively. In retracting the latch bolt, the hubs act directly on the part 32 of the yoke and shift it individually until the wings 33 abut wings 34 on the part 31, whereupon the bolt may be retracted by said part 31.

The latch bolt 25 is normally deadlocked in its protracted position by means such as the following: Pivoted transversely in a cutaway portion of the post or standard 27 is a deadlocking lever 35. The pivot 36 of said lever is located intermediate of the ends of the latter. A spring 37 acting on one end 38 of said lever normally holds it in a position wherein the other end 39 is in the path of the rear extremity 40 of the latch spindle 26. In other words, the lever 35 normally blocks the latch spindle at the rear end of the latter, and thereby prevents the latch bolt from being forced inward. In order to permit the incursion of the latch bolt when the door is being closed, so that the bolt will clear the strike I provide a suitable releasing member, such as the releasing bolt 41. The latch bolt 25 and releasing bolt 41 may be mounted on a common pivot 42, as shown in Fig. 3, and the releasing bolt 41 is so constructed and arranged that it will engage the strike prior to the engagement with the latter of the latch bolt, and will release the lever 35 from its deadlocking position before the latch bolt comes in contact with the strike. To this end, the releasing bolt is provided with a rounded face 43, located in front of the beveled latch bolt face with respect to the strike, and said releasing bolt is provided with a rectilinearly movable shank or stem 44 pivoted to the bolt head at 45, and provided with a rear extremity 46, which, when the releasing bolt is forced inward, engages the extremity 38 of the deadlocking lever 35 and shifts it in opposition to the spring 37 in such a manner as to release the latch bolt shank, as shown in Fig. 11. When released by the bolt 41, the latch bolt 25 on contacting with the strike moves inward in the usual manner, and then moves outward into the opening of the strike as usual. The releasing bolt enters the same opening of the strike engaged by the latch bolt, and as the shank 44 moves toward the front or face of the lock, the deadlocking device 35 will be released thereby, so as to again deadlock the latch bolt in its protracted position.

When the door is to be opened by actuation of either knob, the corresponding hub will first engage and operate the member 32 of the retracting yoke, which member has a shoulder 47, adapted to engage the lever 35 in such a manner as to release the latch bolt for retraction before the lugs 33 of the member 32 engage the lugs 34 of the yoke member 31 for the purpose of actuating it.

As the releasing bolt is usually considerably narrower than the latch bolt, it cannot be so readily attacked by an instrument inserted between the face plate and the strike, but in order to prevent any possibility of releasing the latch bolt by attack on the releasing bolt, I may provide an automatically operated deadlocking mechanism for the releasing bolt which is controlled by movement of the outer face of the door against the jamb. To this end, the releasing bolt is adapted to be deadlocked by the lever 48, pivoted in the case at 49, and normally urged by a spring 50 into the path of the releasing bolt. When the door is open, the lever 48 is held in an inoperative position by a spring protracted plunger 51, having an inclined recess 52, in which the free end of the deadlocking lever is supported. The spring 53 normally protracts the plunger 51 into a rabbet 54 in the outside escutcheon 20, in which position the notch 52 of the plunger is so located as to hold the deadlocking lever out of the path of the releasing bolt. When, however, the door is closed, the plunger 51 is pushed in by contact with the jamb, as shown in Fig. 8, whereupon the deadlocking lever 48 is permitted to move downward into the deepest part of the notch 52, and to engage the rear surface of the bolt head 41, as shown in Fig. 6ª. In this manner, the releasing bolt controlling the operation of the latch bolt is automatically deadlocked as the door is closed. When the door is to be opened, the member 32 of the retracting yoke releases the releasing bolt as well as the deadlocking member 35. To this end, a lug 55, projecting from one of the arms or branches of the member 32, is adapted to engage a shoulder 56 on the deadlocking lever 48, so that as the yoke member 32 is retracted, the deadlocking lever 48 will be swung out of the path of the releasing bolt in an obvious manner.

The releasing bolt is retracted with the latch bolt, owing to the fact that the former is provided at its rear surface with a pin 57, extending into the path of the latch bolt head, as shown in Fig. 6ª, and adapted to be engaged thereby as the latch bolt is retracted.

Various modifications in the construction described may be adopted without digressing from my inventive idea as defined in the claims.

I do not claim herein the organization of the parts of a union or escutcheon lock, as claimed in my companion application, Serial No. 818,397, filed on even date herewith, but what I do claim is:—

1. In a lock, a normally protracted latch bolt, means normally deadlocking the same in protracted position, means for releasing the latch bolt as the door is being closed and means for deadlocking said releasing means; substantially as described.

2. In a lock, a normally protracted latch bolt, means normally deadlocking the same in protracted position, means for releasing the latch bolt as the door is being closed, and means for deadlocking said releasing means automatically by the closing of the door; substantially as described.

3. In a lock, a normally protracted latch bolt, means normally deadlocking the same in protracted position, means for releasing the latch bolt as the door is being closed, means for deadlocking said releasing means automatically by the closing of the door, and means for retracting said latch bolt, operatively connected with both of said deadlocking means; substantially as described.

4. In a lock, a normally protracted latch bolt, means normally deadlocking the same in protracted position, means for releasing the latch bolt as the door is being closed, means for deadlocking said releasing means, a knob for retracting the latch bolt, and means of connection between said knob and both of said deadlocking means to cause the retraction of the bolt by said knob when the door is closed; substantially as described.

5. In a lock, a normally protracted latch bolt, a deadlocking lever normally deadlocking said latch bolt in its protracted position, a releasing bolt acting on said deadlocking lever to release the latch bolt as the door is being closed, and means for deadlocking said releasing bolt; substantially as described.

6. In a lock, the combination of a pivoted latch bolt, a stem or spindle pivoted thereto, means normally protracting said latch bolt, a deadlocking lever normally blocking the incursion of said stem, and a releasing bolt having a shank adapted to engage said deadlocking lever as the door closes, to move said lever out of operative position; substantially as described.

7. In a lock, a normally protracted latch bolt, means normally deadlocking the same in protracted position, a releasing bolt for releasing the latch bolt as the door is being closed, means for deadlocking the releasing bolt automatically on the closing of the door, and latch-retracting means, operatively connected with both of said deadlocking means; substantially as described.

8. In a lock, a normally protracted latch bolt, a lever normally deadlocking said latch bolt in its protracted position, a releasing bolt for said deadlocking lever, means including a second deadlocking lever for deadlocking said releasing bolt automatically by the closing of the door, a knob for retracting the latch bolt, and means of connection between said knob and both of said deadlocking levers, whereby the bolt may be retracted by the knob when the door is closed; substantially as described.

9. In a lock, the combination of a normally deadlocked latch bolt, a releasing member therefor, and means for deadlocking the releasing member; substantially as described.

10. In a lock, a normally protracted latch bolt, means for deadlocking the same in protracted position under normal conditions, a releasing bolt for said means, and means operative automatically on the closing of the door to deadlock said releasing bolt; substantially as described.

11. In a lock, a latch bolt, a bolt controlling the operation thereof, and means for deadlocking the controlling bolt as the door is closed; substantially as described.

12. In a lock, the combination of a pivoted latch bolt, means for retracting the same, a stem or spindle pivoted to said latch bolt, means normally protracting said bolt, a deadlocking lever associated with the rear end of said stem or spindle, and normally lying in the path of said stem so as to block the incursion of the bolt, and a releasing bolt having a shank adapted to engage said deadlocking lever and release the same as the door is being closed; substantially as described.

13. In a lock, the combination of a pivoted latch bolt, means for retracting the same, a stem or spindle pivoted to said bolt, a post or standard forming a guide for said stem or spindle, a deadlocking lever associated with said post or standard, and coöperating with the rear portion of said stem to block the incursion of the bolt under normal conditions, and a releasing bolt having a shank adapted to engage said deadlocking lever to release the same when the door is closed; substantially as described.

14. In a lock, a pivoted latch bolt, means for retracting the same, a stem pivoted to said latch bolt, a post or standard in which said stem is guided for sliding movement, deadlocking means for said latch bolt associated with said standard, and coöperating directly with said stem, a releasing bolt for said deadlocking means, means for deadlocking said releasing bolt automatically by the closing of the door, and means of connection between both of said deadlocking means and said retracting means, whereby the bolt may be retracted by the latter when the door is closed; substantially as described.

15. In a lock, the combination of a latch bolt, means for dogging the same while the door is open, means for temporarily releasing the latch bolt to permit the closing of the door, and means for deadlocking said releasing means; substantially as described.

16. A union lock having a normally dogged latch bolt, and means for releasing said bolt to permit the closing of the door; substantially as described.

17. In a lock, a pivoted latch bolt, means normally dogging the same, and a releasing bolt pivoted coincidently with said latch bolt; substantially as described.

In witness whereof, I have hereunto set my hand on the 30th day of January, 1914.

JOHN H. SHAW.

Witnesses:
 FRANK T. KIRSCHNER,
 BERTHA RAY.